United States Patent
Zuniga et al.

(10) Patent No.: US 10,284,072 B2
(45) Date of Patent: May 7, 2019

(54) VOLTAGE REGULATORS WITH MULTIPLE TRANSISTORS

(71) Applicant: Volterra Semiconductor LLC, San Jose, CA (US)

(72) Inventors: Marco A. Zuniga, Palo Alto, CA (US); Chiteh Chiang, San Jose, CA (US); Yang Lu, Fremont, CA (US); Badredin Fatemizadeh, Sunnyvale, CA (US); Amit Paul, Sunnyvale, CA (US); Jun Ruan, Santa Clara, CA (US); Craig Cassella, San Jose, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 0 days.

(21) Appl. No.: 15/663,249

(22) Filed: Jul. 28, 2017

(65) Prior Publication Data
US 2017/0338731 A1 Nov. 23, 2017

Related U.S. Application Data

(63) Continuation of application No. 14/213,958, filed on Mar. 14, 2014, now Pat. No. 9,722,483.

(60) Provisional application No. 61/790,619, filed on Mar. 15, 2013.

(51) Int. Cl.
*H02M 1/088* (2006.01)
*H02M 1/38* (2007.01)
*H02M 3/158* (2006.01)

(52) U.S. Cl.
CPC ............. *H02M 1/088* (2013.01); *H02M 1/38* (2013.01); *H02M 3/1588* (2013.01); *H02M 3/158* (2013.01); *Y02B 70/1466* (2013.01)

(58) Field of Classification Search
USPC .......................... 323/223–224, 271, 272, 282
See application file for complete search history.

(56) References Cited

U.S. PATENT DOCUMENTS

| | | | | |
|---|---|---|---|---|
| 4,989,179 A | * | 1/1991 | Simko | G11C 16/10 365/104 |
| 6,882,212 B2 | * | 4/2005 | Balakrishnan | H03F 3/217 327/108 |
| 2003/0038615 A1 | * | 2/2003 | Elbanhawy | H02M 3/1584 323/282 |
| 2007/0200184 A1 | * | 8/2007 | Zhu | H01L 29/0653 257/409 |
| 2007/0205778 A1 | * | 9/2007 | Fabbro | G01R 19/0092 324/713 |
| 2008/0265291 A1 | * | 10/2008 | Zhu | H01L 29/0692 257/288 |

(Continued)

*Primary Examiner* — Bryan R Perez
(74) *Attorney, Agent, or Firm* — Lathrop Gage LLP (57) ABSTRACT

A voltage regulator includes a high-side device, a low-side device, and a controller. The high-side device includes first and second transistors each coupled between an input terminal and an intermediate terminal, where the first transistor has a higher breakdown voltage than the second transistor. The low-side device is coupled between the intermediate terminal and a ground terminal. The controller is configured to drive the high-side and low-side devices to (a) alternately couple the intermediate terminal to the input terminal and the ground terminal and (b) cause the first transistor to control a voltage across the second transistor during switching transitions of the second transistor.

20 Claims, 6 Drawing Sheets

(56) References Cited

U.S. PATENT DOCUMENTS

2009/0284990 A1* 11/2009 Pollak ................... H02M 1/36
                                                    363/21.02
2010/0013451 A1* 1/2010 Nakamura .......... H02M 3/1588
                                                    323/282

* cited by examiner

VOLTAGE REGULATORS WITH MULTIPLE TRANSISTORS

RELATED APPLICATIONS

This application is a continuation of U.S. patent application Ser. No. 14/213,958, filed Mar. 14, 2014, which claims benefit of priority to U.S. Provisional Patent Application No. 61/790,619, filed Mar. 15, 2013. Each of the above-mentioned applications is incorporated herein by reference.

TECHNICAL FIELD

The following disclosure relates to semiconductor voltage regulator devices.

BACKGROUND

Voltage regulators, such as DC to DC converters, are used to provide stable voltage sources for electronic systems. Efficient DC to DC converters are particularly needed for battery management in low power devices, such as laptop notebooks and cellular phones. Switching voltage regulators (or simply "switching regulators") are known to be efficient DC to DC converters. A switching regulator generates an output voltage by converting an input DC voltage into a high frequency voltage, and filtering the high frequency input voltage to generate the output DC voltage. Specifically, the switching regulator includes a switch for alternately coupling and decoupling an input DC voltage source, such as a battery, to a load, such as an integrated circuit. An output filter, typically including an inductor and a capacitor, is coupled between the input voltage source and the load to filter the output of the switch and thus provide the output DC voltage. A controller, such as a pulse width modulator or a pulse frequency modulator, controls the switch to maintain a substantially constant output DC voltage.

SUMMARY

In general, in one aspect this disclosure features a voltage regulator having an input terminal and a ground terminal. The voltage regulator includes an n-type high side device between the input terminal and an intermediate terminal, an n-type low-side device between the intermediate terminal and the ground terminal, and a controller that drives the high-side and low-side devices to alternately couple the intermediate terminal to the input terminal and the ground terminal. The high-side device includes a first transistor having a first drain coupled to the input terminal and a first source coupled to the intermediate terminal. The high side device also includes at least a second transistor having a second drain coupled to the first drain of the first transistor and a second source coupled to the intermediate terminal, such that the first transistor controls the drain source switching voltage of the second transistor. The first transistor and the second transistor are driven by the controller, and a drain junction of the first transistor has a doping profile that results in the first transistor having a higher breakdown voltage than the second transistor.

In another aspect, the disclosure features a voltage regulator having an input terminal and a ground terminal. The voltage regulator includes a high-side device, a low side device, and a controller. The high-side device is coupled between the input terminal and an intermediate terminal. The high-side device includes first and second transistors each coupled between the input terminal and the intermediate terminal, such that the first transistor controls a drain-source switching voltage of the second transistor. The low-side device is coupled between the intermediate terminal and the ground terminal. The controller drives the high-side and low-side devices to alternately couple the intermediate terminal to the input terminal and the ground terminal.

In another aspect, the disclosure features a method of operating a switch having a first terminal and a second terminal. The method includes turning on a helper transistor that has a first drain coupled to the first terminal, a first source coupled to the second-terminal, and a first gate. The method also includes turning on a main transistor while the helper transistor is on. The main transistor has a second drain coupled to the first terminal, a second source coupled to the second terminal, and a second gate. The main transistor includes a drain junction doping profile that results in a lower breakdown voltage than a breakdown voltage of the helper transistor. The method also includes turning off the main transistor while the helper transistor is on, and turning off the helper transistor.

In another aspect, the disclosure features a method of operating a switch in a voltage regulator. The switch has a first terminal, a second terminal, and the voltage regulator includes an inductor coupled to one of the first and second terminals. The method includes turning on a helper transistor coupled between the first and second terminals. The method further includes turning on a main transistor while the helper transistor is on, where the main transistor is coupled between the first and second terminals. The main transistor includes a drain junction doping profile that results in a lower breakdown voltage than a breakdown voltage of the helper transistor. The method further includes turning off the main transistor while the helper transistor is on and turning off the helper transistor after the main transistor is turned off.

In another aspect, the disclosure features a method of operating voltage regulator in a test mode. The method includes enabling a test mode for the voltage regulator having a high-side device and a low-side device, wherein the test mode allows for passing current through portions of the high-side device and the low-side device simultaneously. The method also includes turning on a transistor of the high-side device. The transistor has a first drain coupled to an input terminal between the high-side and low-side devices and a first source coupled to an intermediate terminal of the voltage regulator. The method further includes turning on a helper transistor and a main transistor of the low-side device, such that current through the transistor of the high-side device passes through the helper transistor and the main transistor of the low-side device.

In another aspect, a method of operating a voltage regulator in a test mode includes enabling a test mode for the voltage regulator having a high-side device and a low-side device. The test mode allows for passing current through portions of the high-side device and the low-side device simultaneously. The method additionally includes turning on a transistor of the high-side device, where the transistor is coupled between an intermediate terminal of the voltage regulator and an input terminal of the voltage regulator. The method further includes turning on a helper transistor and a main transistor of the low-side device coupled to the intermediate terminal, such that current through the transistor of the high-side device passes through the helper transistor and the main transistor of the low-side device.

Implementations can include one or more of the following.

The drain junction of the first transistor can have a lighter doping than the drain junction of the second transistor. A size of the first transistor is between 20% and 30% of the size of the second transistor. The on-state conductance of the first transistor is lower than the on-state conductance of the second transistor. A switching time associated with the first transistor can be longer than a switching time associated with the second transistor. A saturation current of the first transistor can be higher than a load current flowing out of the intermediate terminal. The first transistor can have a larger safe operating area (SOA) than the second transistor. A thickness of the gate of the first transistor can be larger than a thickness of the gate of the second transistor. The second drain can be coupled to the input terminal. The second source can be coupled to the first source. The high-side device can include a first inverter connected to the gate of the first transistor and a second inverter connected to the gate of the second transistor. The controller can drive the high-side device by controlling the first and second transistors through the first and second inverters, respectively. The low-side device can include a third transistor having a third drain coupled to the intermediate terminal and a third source coupled to the ground terminal, and at least a fourth transistor having a fourth drain coupled to the third drain and a fourth source coupled to the ground terminal. The third transistor can at least in part control an operation of the fourth transistor. The third transistor and the fourth transistor are driven by the controller, the third transistor having a smaller size and higher breakdown voltage than the fourth transistor. The drain junction of the third transistor can have a lighter doping profile than the drain junction of the fourth transistor. A size of the third transistor can be between 20% and 30% of the size of the fourth transistor. The third transistor can have a larger safe operating area (SOA) than the fourth transistor. A thickness of the gate of the third transistor is larger than a thickness of the gate of the fourth transistor. The fourth drain can be coupled to the intermediate terminal. The fourth source can be coupled to the third source. The low-side device can include a third inverter connected to the gate of the third transistor and a fourth inverter connected to the gate of the fourth transistor. The controller can drive the low-side device by controlling the third and fourth transistors through the third and fourth inverters, respectively. The controller can be configured to turn on the first transistor before turning on the second transistor. The controller can be configured to impose a delay between turning on the first and second transistors. The controller can be configured to turn off the first transistor after turning off the second transistor. The control circuit can be configured to impose a delay between turning on the first and second transistors. The first transistor can be more robust to handling switching transients than the second transistor. The first and second transistors can be implemented as a single monolithic device. The first and second transistors and the controller can be implemented as a single monolithic device.

Turning on and off the main transistor and the helper transistor can include directing signals from a controller to the first and second gates. Turning on the main transistor can be delayed for a predetermined period of time after turning on the helper transistor. Turning off the helper transistor can be delayed for a predetermined period of time after turning off the main transistor. The main transistor and helper transistor can be implemented as a single monolithic device. The helper transistor can have an area less than the area of the main transistor.

A failure condition within the voltage regulator can be checked for while the test mode is enabled. The voltage regulator can be marked as defective on detecting the failure condition. The helper transistor can include a second drain coupled to a intermediate terminal of the voltage regulator and a second source coupled to the ground terminal. The main transistor can include a third drain coupled to the second drain and a third source coupled to the ground terminal. The helper transistor and the main transistor are turned on by a controller disposed in the voltage regulator, the controller being connected to respective gates of the helper transistor and the main transistor.

Certain implementations may have one or more of the following advantages. By dividing the high-side and low-side devices of a regulator as cascades of two or more transistors, switching characteristics and current capacity can be simultaneously optimized. A portion of the regulator can be optimized to handle switching transients while another portion can be optimized for high conductance. This can lead to an overall savings in power consumption for the regulator. Voltage build-up at an intermediate terminal of the regulator can be slowed down using the cascaded structure, thereby reducing voltage transients and capacitive coupling of the intermediate terminal to the gates of the low-side device. The cascade structure of multiple transistors allows for engineering breakdown voltages and safe operating areas of the transistors separately, thereby allowing for greater design flexibility.

The details of one or more implementations are set forth in the accompanying drawings and the description below. Other features, aspects, and advantages will become apparent from the description, the drawings, and the claims.

DESCRIPTION OF DRAWINGS

Exemplary implementations will hereinafter be described in conjunction with the appended drawings, wherein like designations denote like elements, and wherein.

DETAILED DESCRIPTION

Power electronics and systems are in a continuous push to continue to improve overall performance. Performance can be measured, for example, by power dissipation, electrical robustness/reliability, and cost. These metrics can be affected, for example, by the device architecture choices and circuit architecture choices.

Figure 1:
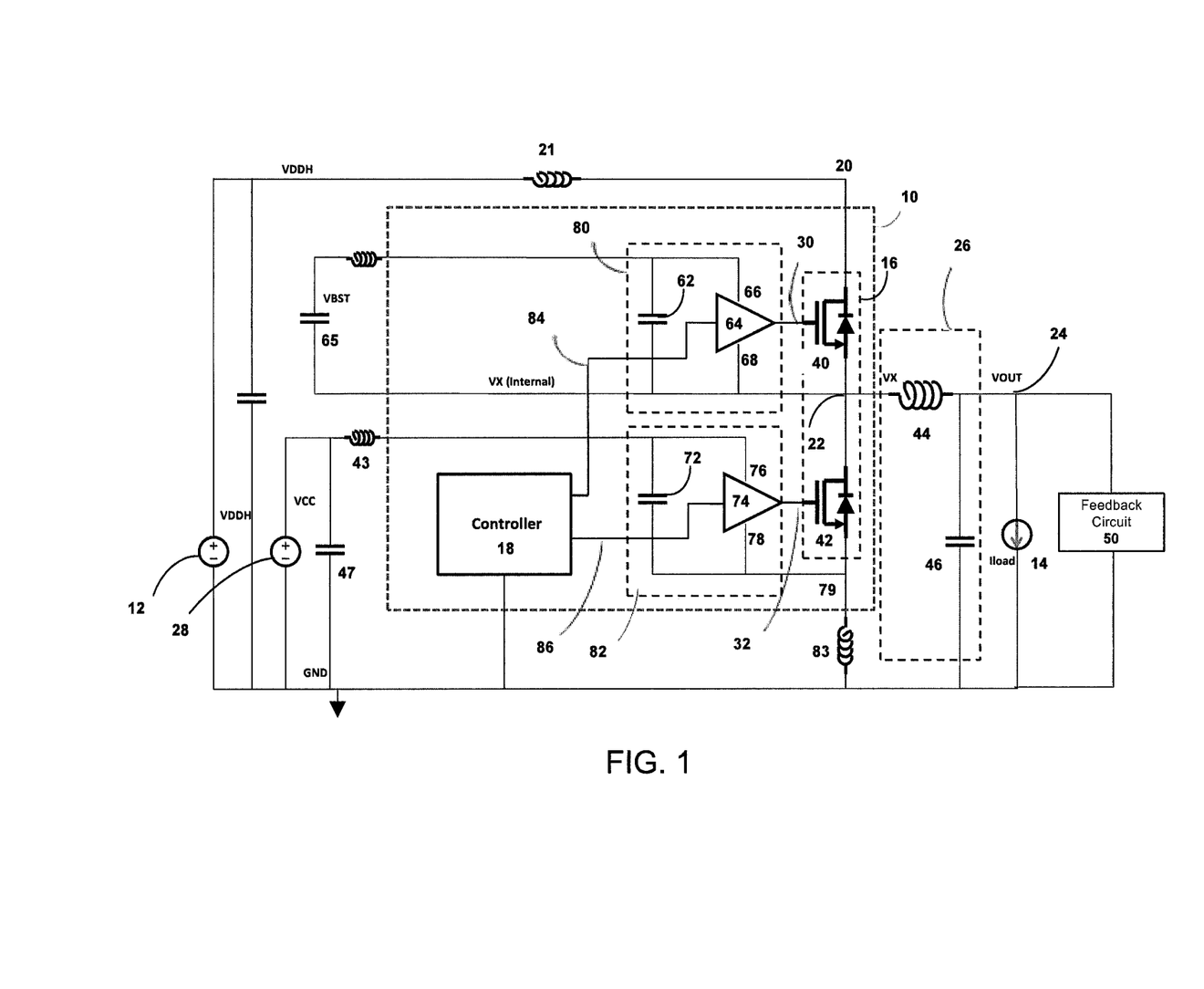
FIG. 1 is a circuit diagram of a switching regulator.

Referring to FIG. 1, a switching regulator 10 is coupled to a first high direct current (DC) input voltage source 12, such as a battery, by an input terminal 20. The voltage at the input terminal 20 can be referred to as $V_{DDH}$. The switching regulator 10 is also coupled to a load 14, such as an integrated circuit, by an output terminal 24. The switching regulator 10 serves as a DC-to-DC converter between the input terminal 20 and the output terminal 24. The switching regulator 10 includes a switching circuit 16 which serves as a power switch for alternately coupling and decoupling the input terminal 20 to an intermediate terminal 22. The switching circuit 16 includes a rectifier, such as a switch or diode, coupling the intermediate terminal 22 to ground. Specifically, the switching circuit 16 can include a first transistor 40, called a high-side transistor, having a drain connected to the input terminal 20 and a source connected to the intermediate terminal 22 and a second transistor 42, called a low-side transistor, or synchronous transistor, having a source connected to ground and a drain connected to the intermediate terminal 22. Thus, first transistor 40 is coupled between input terminal 20 and intermediate terminal 22, and second transistor 42 is coupled between intermediate terminal 22 and ground.

In some implementations, the transistors described in this document can be field effect transistors (FET) such as Metal Oxide Semiconductor FETs (MOSFET). In some implementations, the first transistor 40 can be a Positive-Channel Metal Oxide Semiconductor (PMOS) transistor, and the second transistor 42 can be a Negative-Channel Metal Oxide Semiconductor (NMOS) transistor. In another implementation, the first transistor 40 and the second transistor 42 can both be NMOS transistors. In another implementation, the first transistor 40 can be a PMOS, NMOS, or a Lateral Double-diffused Metal Oxide Semiconductor (LDMOS), and the second transistor 42 can be an LDMOS.

The intermediate terminal 22 is coupled to the output terminal 24 by an output filter 26. The output filter 26 converts the rectangular waveform of the intermediate voltage at the intermediate terminal 22 into a substantially DC output voltage at the output terminal 24. Specifically, in a buck-converter topology, the output filter 26 includes an inductor 44 connected between the intermediate terminal 22 and the output terminal 24 and a capacitor 46 connected in parallel with the load 14. During a high-side conduction period, the first transistor (also referred to as the high-side transistor) 40 is closed (or switched on), and the DC input voltage source 12 supplies energy to the load 14 and the inductor 44 via the first transistor 40. On the other hand, during a low-side conduction period, the second transistor (also referred to as the low side transistor) 42 is closed, and current flows through the second transistor 42 as energy is supplied by the inductor 44. The resulting output voltage $V_{OUT}$ is a substantially DC voltage.

The switching regulator also includes a controller 18, a high-side driver (also referred to as a high-side driver circuit) 80 and a low-side driver (also referred to as a low-side driver circuit) 82 for controlling the operation of the switching circuit 16. A first control line 30 connects the high-side transistor 40 to the high-side driver 80, and a second control line 32 connects the low-side transistor 42 to the low-side driver 82. The high-side and low-side drivers are connected to the controller 18 by control lines 84 and 86, respectively. The controller 18 causes the switching circuit 16 to alternate between high-side and low-side conduction periods so as to generate an intermediate voltage $V_X$ at the intermediate terminal 22 that has a rectangular waveform. The controller 18 can also include a feedback circuit 50, that can be configured to measure the output voltage $V_{OUT}$ and/or the current $I_{load}$ passing through the output terminal 24. Although the controller 18 is typically a pulse width modulator, the methods and systems described in this document can be also applicable to other modulation schemes, such as pulse frequency modulation.

In some implementations, the high-side transistor 40 and the high-side driver 80 can be collectively referred to as a high-side device. The high side driver 80 can include a high-side capacitor 62 and a high-side inverter 64. The high-side inverter 64 includes a positive voltage terminal 66 that is coupled to a capacitor 65 that is configured to hold a boost voltage $V_{BST}$ for the high-side driver. The high-side inverter 64 also includes a negative voltage terminal 68 that is connected to the intermediate terminal 22 of the switching regulator 10. The high-side inverter 64 can be connected to the controller 18 by the control line 84, and to the gate of the high-side transistor 40 by the control line 30. The controller 18 can be configured to control the inverter 64 to switch on or switch off the high-side transistor 40.

In some implementations, the low-side transistor 42 and the low-side driver 82 can be collectively referred to as a low-side device. The low-side driver 82 can include a low-side capacitor 72 and a low-side inverter 74. The low-side inverter 74 includes a positive voltage terminal 76 that is coupled to a second DC input voltage source 28. The voltage $V_{CC}$ from the DC voltage source 28 can be used to supply power to the low-side driver 82. In some implementations, the DC voltage source 28 can be adjustable such that the output of the DC voltage source 28 can be varied within a range. The low-side inverter 74 also includes a negative voltage terminal 78 that is connected to the internal ground terminal 79 of the switching regulator 10. The internal ground 79 of the switching regulator 10 can be at a different potential than the actual ground because of the presence of parasitic inductances represented in FIG. 1 as the inductor 83. The low-side inverter 74 can be connected to the controller 18 by the control line 86, and to the gate of the low-side transistor 42 by the control line 32. The controller 18 can be configured to control the inverter 74 to switch on or switch off the low-side transistor 42.

In some alternate embodiments, high-side inverter 64 and/or low side inverter 74 are replaced by other driver circuitry configured to drive the gates of high-side transistor 40 and low-side transistor 42, respectively, under the command of controller 18.

A voltage $V_{DDH}$, for example 12V, is applied to the high-side transistor 40, and when the high-side transistor 40 is on, current flows through the transistor 40 and the inductor 44. In contrast, when the low-side transistor 42 is on, the inductor 44 pulls current from the ground. Under normal operation, the regulator 10 switches between turning the high-side transistor 40 and the low-side transistor 42 on such that the output of the filter 26 produces the desired voltage $V_{OUT}$. $V_{OUT}$ is a voltage between 0V and $V_{DDH}$.

To improve efficiency of the regulator, it is desirable to have the high-side transistor 40 on while the low-side transistor 42 is off, and vice versa. However, some downtime may be required between the switching in order to avoid having both transistors 40, 42 on and at same time, which can cause shoot-through and result in significant efficiency losses and damage to the transistors. Thus, there is a short period, the intrinsic deadtime $t_d$, between each high-side conduction and low-side conduction period in which both transistors are open.

When both transistors 40, 42 are off, current through the inductor 44 will not instantly drop to zero. The voltage across the inductor is determined by Equation 1:

$$V = L(di/dt), \hspace{2cm} \text{(Equation 1)}$$

where V is the voltage, L is the inductance, and i is the current in the inductor. As the inductor current decreases, the voltage at the input end, i.e. near $V_{DDH}$, of the inductor is forced to be negative. When this voltage reaches a value (e.g. −0.7 V) that causes the low-side transistor 42 to reach a corresponding threshold voltage, the low-side transistor 42 begins conducting current into the inductor.

The high-side transistor 40 and the low-side transistor 42 can be controlled by controlling the gate voltage at the respective gates. Changing the gate voltage of the transistors can affect power dissipation and/or efficiency of the regulator 10. In some implementations, if the gate voltage is adjusted such that a voltage between the gate and source ($V_{gs}$) is increased, the increase can result in a lower ON-resistance (or higher conductance), thereby reducing resistive losses associated with the corresponding transistor. However, in some implementations, an increased $V_{gs}$ can result in an increased switching loss.

In some implementations, a design trade-off between the breakdown voltage and conductance can be encountered in designing the high-side and low-side devices. A higher breakdown voltage can be desirable, for example, to make a device more robust or resistant to negative effects of switching transients such as voltage or current transients. However, a high breakdown voltage can result in a reduction in a current carrying capacity of the device. In some implementations, by having multiple transistors in cascade within the device, and optimizing the individual transistors for specific purposes, the device can be configured to have both good switching characteristics as well as good current capacity.

Figure 2:
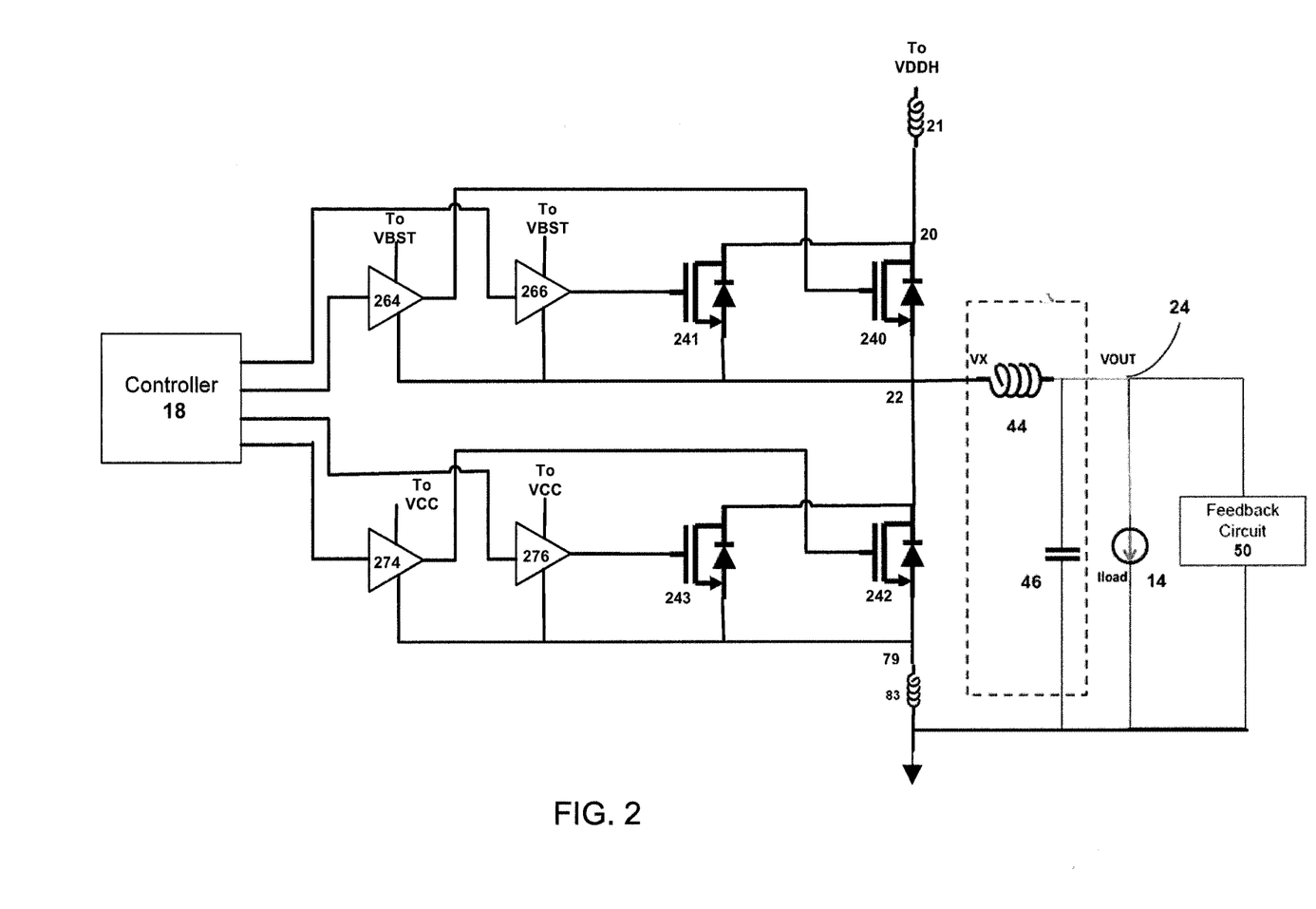
FIG. 2 is a partial circuit diagram of a switching regulator with multiple transistors in the high-side and low-side devices.
Figure 6:
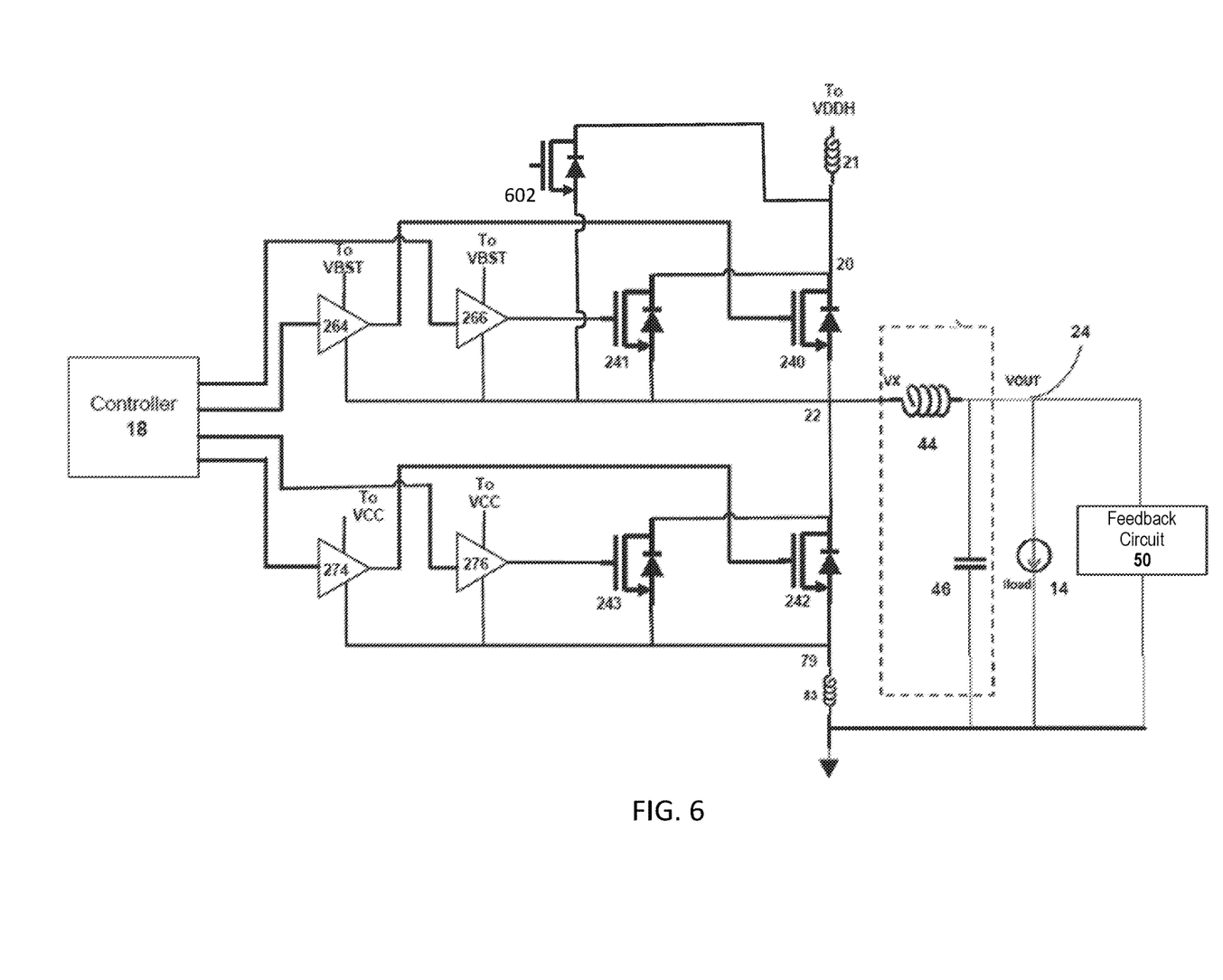
FIG. 6 is a partial circuit diagram of another switching regulator with multiple transistors in the high-side and low-side devices.

FIG. 2 is a circuit diagram of a portion of a voltage regulator illustrating the use of multiple cascaded transistors in the high-side and low-side devices. In this example, the high-side device includes a helper transistor 241 and a main transistor 240 (also referred to as a helpee transistor). The low-side device also includes a helper transistor 243 and a main transistor 242. In some implementations, each of the high-side and the low-side devices can include additional transistors in the cascade. For example, a device can have three, four or more transistors in cascade. For instance, FIG. 6 illustrates one alternate embodiment where the high-side device includes an additional transistor 602. In such cases, each pair of adjacent transistors can be in a helper-helpee relationship. The number of transistors in cascade can be different for the high-side device and the low-side device.

The controller 18 can control the timing of the operation of the main and helper transistors. The helper transistor can control the drain voltage of the main transistor during the switching transition of the main transistor, thereby controlling the drain-source switching voltage of the main transistor. The drain of the main transistor can be coupled to the drain of the helper transistor. The source of the main transistor can be coupled to the source of the helper transistor. In the following paragraphs, the helper transistor and the main transistor are described with reference to the high-side helper transistor 241 and the high-side main transistor 240, respectively. However, unless a distinction is specifically made, the description also applies to the helper and main transistors, respectively, of the low side device.

The controller 18 can control the timing of the gate signals for the main transistor 240 and the helper transistor 241 such that the main transistor 240 is less exposed to undesirable switching transients during a switching scenario. For example, during a switching condition when the high-side device is turning on, the controller 18 can turn on the helper transistor 241 first. The helper transistor 241, which typically has better switching characteristics, handles the stressful switching transients during the initial part of the switching. The transients usually disappear after an initial time period, and accordingly, the controller can switch on the main transistor after a predetermined time following the turning on of the helper transistor 241. Because the main transistor 240 does not have to encounter the switching transients, the design of the main transistor 240 can be optimized for another performance measure, such as conductance. Therefore, by cascading two or more transistors in a device, the device can be made to have both good switching characteristics, as well as high conductance (or current capacity).

The helper and main transistors can be controlled by the controller 18 through one or more inverters or other driver circuitry. For example, the helper transistor 241 and the main transistor 240 of the high-side device can be controlled by inverters 266 and 264, respectively. Similarly, the helper transistor 243 and the main transistor 242 of the low-side device can be controlled by the inverters 276 and 274, respectively. Each of the inverters can have an input terminal that is connected to the controller 18, an output terminal that is connected to the gate of the respective transistor. Each of the inverters can also have a positive voltage terminal and a negative voltage terminal that are suitably connected depending on, for example, whether the inverter is in a low-side device or a high-side device.

In some implementations, the helper transistor 241 can be designed to be robust and have better switching characteristics. For example, the helper transistor 241 can be made to have a thicker gate oxide than the main transistor 240, such that the corresponding breakdown voltage is higher. A higher breakdown voltage can result in the helper transistor 241 being more resistant to voltage and current transients encountered during switching.

In some implementations, the helper transistor 241 can be of a smaller size than the main transistor 240. For example, the channel width of the helper transistor can be between 20% and 30% of the channel width of the main transistor 240, wherein the channel width is measured in a direction perpendicular to the channel length. The smaller helper transistor 241 can have a higher resistivity (or less conductance) than the main transistor 240, making the helper transistor more suitable to handle voltage and current transients. In some implementations, the drain junction profile of the helper transistor 241 is doped such that the helper transistor can sustain a higher electric field as compared to the main transistor, and as a result the helper transistor 241 can have a breakdown voltage higher than that of the main transistor 240.

In some implementations, a size of the helper transistor 241 can be configured such that the drain saturation current $I_{Dsat}$ of the helper transistor 241 is higher than the load current flowing out of the regulator. The high $I_{Dsat}$ pulls up the potential at the intermediate terminal 22. However, because of a relatively small size of the helper transistor 241, the switching is relatively slow and the potential at the intermediate terminal 22 is pulled up gradually. The gradual rise of the potential at the intermediate terminal 22 can dampen the voltage overshoot (or transients) on VDDH due to, for example, a slower current buildup in the parasitic inductance 21.

In some implementations, the helper transistor can be designed to have a larger safe operating area (SOA) than the main transistor. The safe operating area (SOA) can be defined as the voltage and current conditions over which the transistor can be expected to operate without self-damage. Having a cascade of transistors in the low-side and high-side devices allows for greater flexibility in designing the regulator. For example, for a given device the SOA for the main transistor 240 can be less than 20V. However, because the main transistor 240 is not turned on during an initial period of switching, the helper transistor can be designed to have a higher breakdown voltage (BV) rating, e.g., 25V. Therefore for the given device, it is possible to have a mixed BV-SOA rating where the BV is higher than the SOA of the device.

In some implementations, the SOA of a device can be limited by a maximum load current ($I_{max}$) under which the device can sustain electrical overstress without being damaged. In some implementations, having a helper transistor in cascade with a main transistor can extend the limit of the maximum load current that the device can sustain. For example, during a turn-off period of the high-side device, the main transistor is turned off first and the helper transistor is turned off after a predetermined time period following the turning off of the main transistor. During that predetermined time period, the helper transistor is in saturation and the corresponding saturation current $I_{Dsat}$ slows down the ramp down of the intermediate terminal 22, thereby reducing the effects of voltage transients at the intermediate terminal 22. Further, during the predetermined time period, the maximum load current capability of the device is increased to $I_{max}+I_{Dsat}$, thereby providing additional protection against current transients during a turn-off period.

Referring back to FIG. 1, when the low-side transistor 42 turns off and the high-side transistor 40 turns on, the switching can result in large voltage transients on the intermediate terminal 22. Without being limited to any particular theory, the resulting fast rate of voltage change can produce a displacement current on the drain side of the low-side transistor 42, due to, for example, presence of parasitic inductance represented by the inductor 83. The displacement current can cause the gate voltage of the low-side transistor to rise momentarily, thereby partially turning on the low-side transistor 42. A combination of the above effects causes the internal ground 79 of the regulator to be pulled up to a level higher than the external ground. This is often referred to as a ground bounce, and causes the capacitor 72 to discharge through the inductor 43 into the off-chip bypass capacitor 47. Due to this discharge of the capacitor 72, the pull-down strength (also referred to as the drive) of the low-side transistor 42 is reduced. A combination of the weaker pull-down strength and the gate voltage induced by the displacement current can result in switching losses often referred to as kickback. In some implementations, the kickback can be reduced by placing a sufficiently high valued resistor in the discharge path, for example, between the inductor 43 and the capacitor 47. While such a resistor can be effective in reducing the kickback, the resistor can also undesirably increase a charge-up time (also referred to as a rise time) for the capacitor 72.

By using a helper transistor 243 and a main transistor 242 in the low-side device, the kickback effect can be reduced by making the potential at the intermediate terminal rise gradually. The gradual rise of the potential at the intermediate terminal 22 can also result in lower capacitive coupling of the intermediate terminal with the gate of the low-side helper transistor 243 and/or the gate of the low-side main transistor 242. The lower capacitive coupling with the low-side gates reduces the chances of partial turn-on of the low-side devices during an OFF state of the low-side device, which in turn leads to reduction in kickback effects and lower switching losses for the regulator.

Figure 3:
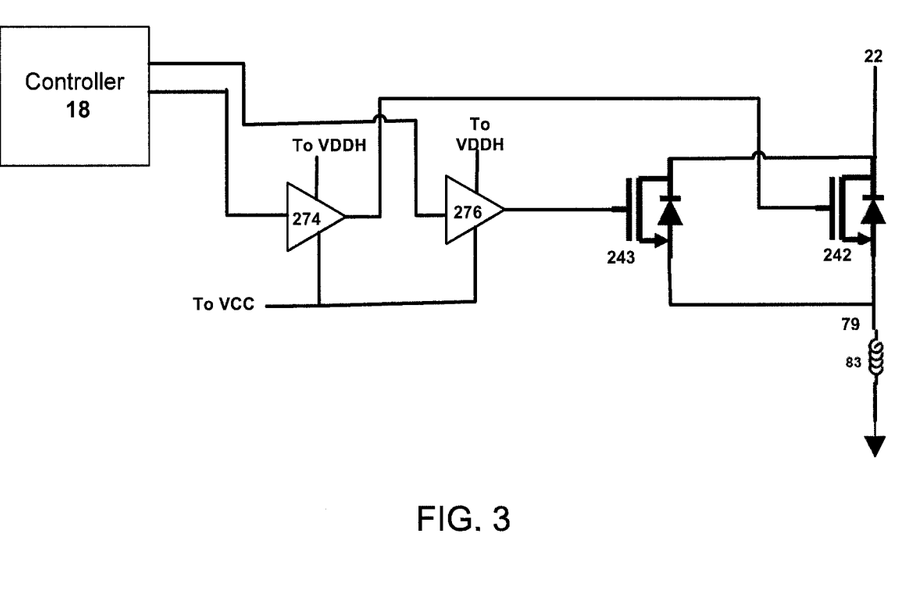
FIG. 3 is a partial circuit diagram illustrating a configuration of a voltage regulator.

FIG. 3 shows an example of a configuration that can be used for reducing power consumption and increasing efficiency of a voltage regulator with cascaded transistors. In this configuration, the negative (or reference) voltage terminals of the inverters 274 and 276 of the low-side device are connected to a DC voltage source $V_{cc}$ (rather than the internal ground 79). Accordingly, the reference voltage terminals of inverters 274 and 276 are coupled to a voltage source having a higher electrical potential than internal ground 79, in these embodiments. In some implementations, the DC voltage source can be the source 28 described with reference to FIG. 1. The positive voltage terminal of the low-side inverters 274 and 276 can be connected to the input terminal 20 such that the low-side inverter is powered on the positive voltage side by the voltage $V_{DDH}$ that may be provided by the DC voltage source 12.

Using a non-zero $V_{CC}$ as a ground reference for the low-side inverters reduces the voltage difference between the positive and negative voltage terminals, and can lead to significant savings in power consumption. For example, if the $V_{DDH}$ is at 12V, and the $V_{CC}$ is at 1.8V, the difference between the terminals is 10.2V (rather than 12V for the case when the negative voltage terminal is connected to ground), and a power saving proportional to a square of the ratio between 12 and 10.2 can be achieved. Such reduced gate voltage swing also reduces capacitive losses. Further, using the non-zero $V_{CC}$ bias in the OFF state of the low-side device enables easier turn-on of the low-side transistors in the third quadrant of operation.

Using a non-zero $V_{CC}$ also allows for increased flexibility in designing the regulator. Various levels of $V_{CC}$ can be used as long as $V_{CC}$ does not exceed the threshold voltage $V_T$ of the low-side device. For example, for $V_T$ of about 4V, $V_{CC}$ can be kept at 1.8V such that the effective threshold voltage $V_{Teff}$ is about 2.2V for the low-side device.

In some implementations, it can be desirable to have comparable threshold voltages for the high-side device and the low-side device. While design limits prevent the threshold voltages of the low-side transistors to be as low as that of the high-side transistors (which can be, for example, 0.5V), having a small difference between the two threshold voltages helps in preventing effects such as reverse recovery losses. In some implementations, because an adjustable $V_{CC}$ can be used as the reference voltage for the low-side inverters 274 and 276, a device designer is afforded additional flexibility of manipulating the $V_T$ of the low-side transistors 242 and 243, such that the effective threshold voltage $V_{Teff}$ is substantially same as, or at least comparable to the threshold voltage of the high-side transistors. For example, for a $V_{CC}$ of 1.8V, $V_T$ can be designed to be around 2.3V (which is well within design limits), such that $V_{Teff}$ is about 0.5V.

Figure 4:
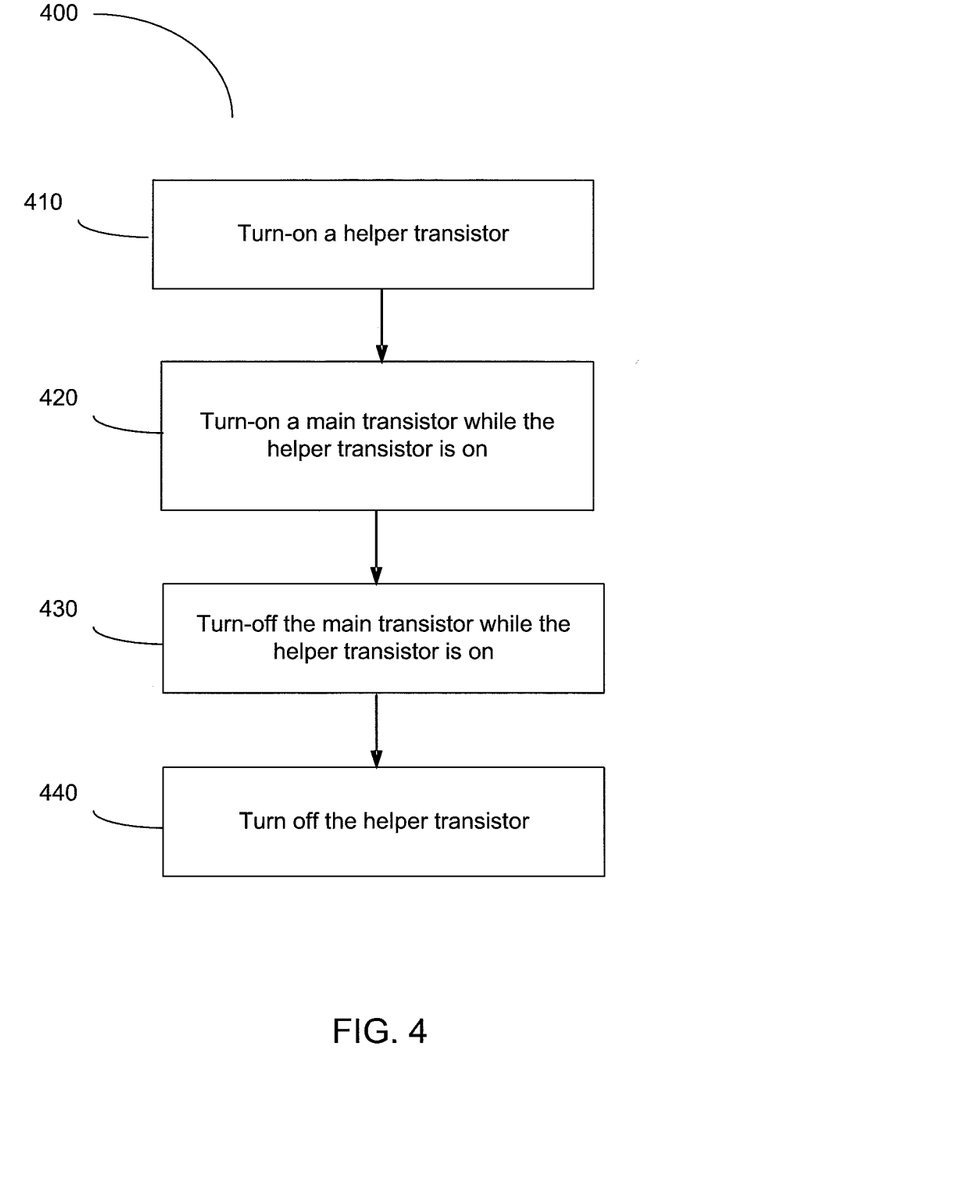
FIG. 4 is a flowchart showing an example sequence of operations for operating a switch.

FIG. 4 shows a flowchart 400 of an example sequence of operations for operating a switch, such as a switch in a voltage regulator. The switch can have a first terminal and a second terminal, and in some embodiments, an inductor is coupled to the second terminal. The operations can be performed by, for example, a controller such as the controller 18 described with reference to FIG. 1. Operations can include turning on a helper transistor (410). The helper transistor can have a drain that is coupled to the first terminal of the switch. The helper transistor can also have a source that is connected to the second terminal of the switch. The helper transistor also has a gate that can be coupled to, for example, the controller that controls the helper transistor. In some implementations, the first and second terminals of the switch can be the input terminal and intermediate terminals, respectively, of a switching regulator. In some implementations, the first and second terminals of the switch can be the intermediate terminal and ground terminal, respectively, of a switching regulator.

Operations also include turning on a main transistor while the helper transistor is on (420). The main transistor and the helper transistor can be turned on based on a control signal from the controller. The main transistor can be turned on after a predetermined time period following the turning on of the helper transistor. The main transistor can have a larger size and lower breakdown voltage than the helper transistor. The main transistor and the helper transistor can be substantially similar to the main transistor 240 and helper transistor 241, respectively, as described above with reference to FIG. 2.

Operations can also include turning off the main transistor while the helper transistor is on (430), and turning off the helper transistor (440). The helper transistor can be switched off after a predetermined time period following the turning-off of the main transistor. The turning-off of the main transistor and the helper transistor can be controlled by the controller.

Figure 5:
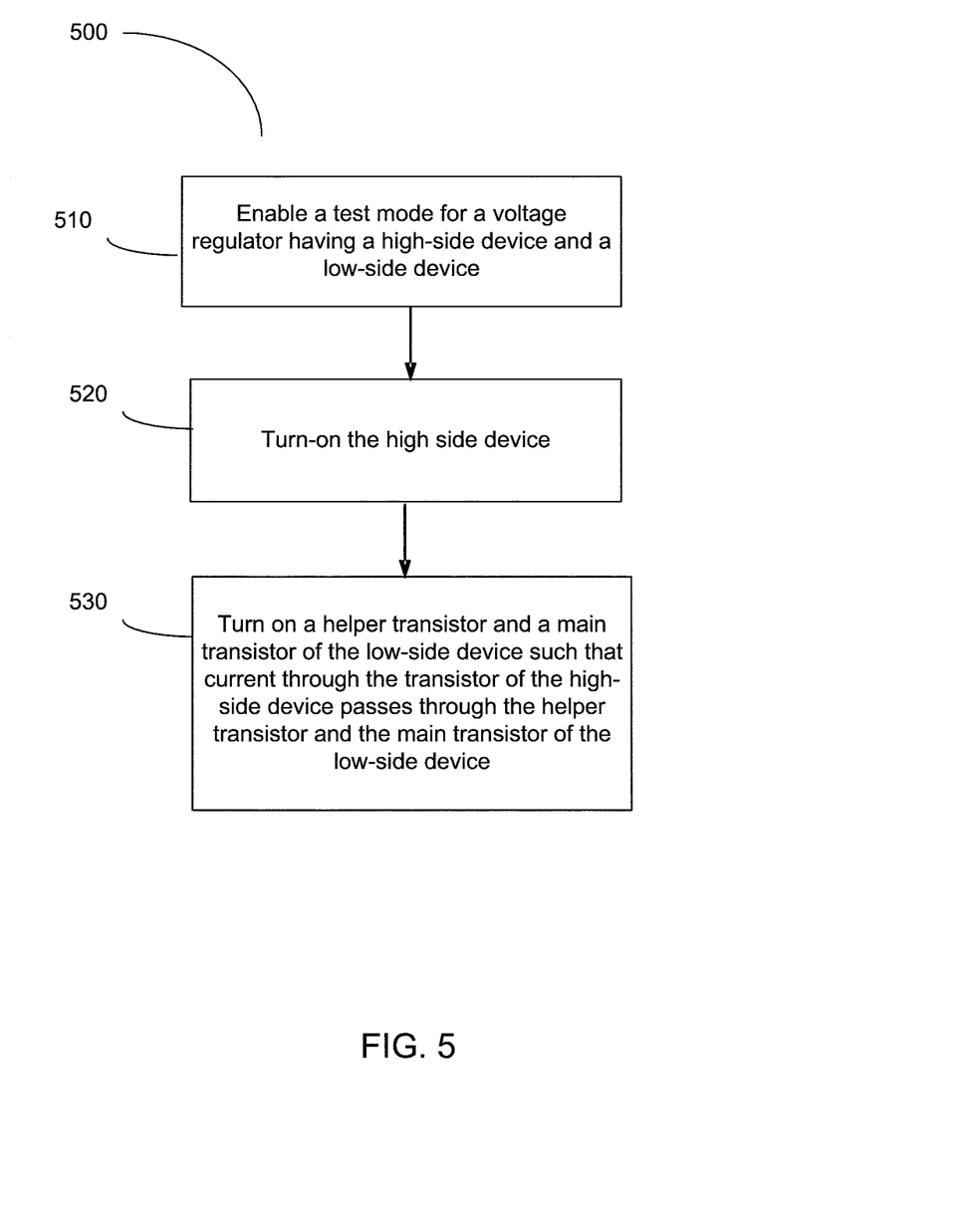
FIG. 5 is a flowchart showing an example sequence of operations for operating a voltage regulator in a test mode.

FIG. 5 is a flowchart 500 showing an example sequence of operations for operating a voltage regulator in a test mode. The operations can be performed in, for example, automated testing equipment (ATE). Operations can include enabling a test mode (510). The test mode can allow for passing current through portions of the high-side device and the low-side device simultaneously, a situation that may not be permitted outside the test mode. For example, outside the test mode, a controller (e.g., the controller 18) can be configured to implement a lockout mode that prevents a high side device and a low-side device of a regulator to be switched on simultaneously. The lockout mode prevents cross conduction between the high-side and low-side devices, thereby avoiding stressful and potentially damaging power densities within the regulator. However, when cascaded transistors are used in the high-side and low-side devices, current flowing through a helper transistor of a high-side device can be allowed (under the test mode) to flow through the cascaded transistors in the low-side. This can internally create controlled stress within the regulator that can be used, for example, to test the SOA of the devices, or detect weak parts within the devices.

Operations can include turning on a transistor of the high-side device (520). The high-side device can be substantially similar to the high-side device described with reference to FIG. 2 and can include multiple transistors connected in cascade. The transistor that is turned on can be a helper transistor. The transistor can have a first source coupled to an intermediate terminal between the high-side and low-side devices and a first drain coupled to an input terminal of the voltage regulator.

Operations can also include turning on a helper transistor and a main transistor of the low-side device (530). In some implementations, if the low-side device includes more than two transistors in cascade, additional transistors over and above the helper and main transistors can be turned on. The low-side transistors can be turned on without turning on the main transistor of the high-side device. The lockout mode can be disabled by the controller prior to turning on the low-side transistors, such that current flowing through the high-side helper transistor (or another high-side transistor) flows through two or more low-side transistors to the ground. Such current flow can create controlled stress conditions by means of internal current flow, that can potentially make weak parts fail. Upon detection of one or more weak parts under the above mentioned test conditions, a given regulator can be marked as defective. The test conditions that can be created using the cascaded transistor structures in the high and low side devices, can therefore be used, for example, as a quality control check.

A number of implementations have been described. Nevertheless, it will be understood that various modifications can be made without departing from the spirit and scope of the disclosure. For example, one or more of transistors 240, 241, 242, and 243 can be replaced with a different type of transistor without departing from the scope hereof. Additionally, certain implementations can include combinations of features from the various implementations described above. For example, a kickback protection circuit can be used in conjunction with a feedback circuit for adjusting the VCC in accordance with the output current. The following examples illustrate some other possible combinations:

(A1) A voltage regulator having an input terminal and a ground terminal may include: (1) a high-side device coupled between the input terminal and an intermediate terminal, the high-side device including first and second transistors each coupled between the input terminal and the intermediate terminal, such that the first transistor controls a drain-source switching voltage of the second transistor; (2) a low-side device coupled between the intermediate terminal and the ground terminal; and (3) a controller that drives the high-side and low-side devices to alternately couple the intermediate terminal to the input terminal and the ground terminal.

(A2) In the voltage regulator denoted as (A1), a drain junction of the first transistor may have a doping profile that results in the first transistor having a higher breakdown voltage than the second transistor.

(A3) In either of the voltage regulators denoted as (A1) or (A2): the first transistor may have a first drain coupled to the input terminal and a first source coupled to the intermediate terminal; and the second transistor may have a second drain coupled to the first drain of the first transistor and a second source coupled to the intermediate terminal.

(A4) In any of the voltage regulators denoted as (A1) through (A3), the low-side device may include: (1) a third transistor having a third drain coupled to the intermediate terminal and a third source coupled to the ground terminal; and (2) a fourth transistor having a fourth drain coupled to the third drain and a fourth source coupled to the ground terminal, such that the third transistor controls the drain-source switching voltage of the fourth transistor, wherein a drain junction of the third transistor has a doping profile that results in the third transistor having a higher breakdown voltage than the fourth transistor.

(A5) In the voltage regulator denoted as (A4), the drain junction of the third transistor may have a lighter doping profile than the drain junction of the fourth transistor.

(A6) In either of the voltage regulators denoted as (A4) or (A5), a size of the third transistor may be smaller than a size of the fourth transistor, and the size of the third transistor may be between 20% and 30% of the size of the fourth transistor.

(A7) In any of the voltage regulators denoted as (A4) through (A6), the third transistor may have a larger safe operating area (SOA) than the fourth transistor.

(A8) In any of the voltage regulators denoted as (A4) through (A7), a thickness of the gate of the third transistor may be larger than a thickness of the gate of the fourth transistor.

(A9) In any of the voltage regulators denoted as (A4) through (A8): (1) a gate of the third transistor may be driven by a first inverter; (2) a gate of the fourth transistors may be driven by a second inverter; (3) a reference voltage terminal of the first inverter and a reference voltage terminal of the second inverter may each be coupled to a voltage source having a higher electrical potential than the ground terminal.

(A10) In any of the voltage regulators denoted as (A4) through (A9), an on-state conductance of the third transistor may be lower than an on-state conductance of the fourth transistor.

(A11) In any of the voltage regulators denoted as (A1) through (A9), a drain junction of the first transistor may have a lighter doping profile than a drain junction of the second transistor.

(A12) In any of the voltage regulators denoted as (A1) through (A11), a size of the first transistor may be smaller than a size of the second transistor, and a size of the first transistor may be between 20% and 30% of a size of the second transistor.

(A13) In any of the voltage regulators denoted as (A1) through (A12), an on-state conductance of the first transistor may be lower than an on-state conductance of the second transistor.

(A14) In any of the voltage regulators denoted as (A1) through (A13), a switching time associated with the first transistor may be longer than a switching time associated with the second transistor.

(A15) In any of the voltage regulators denoted as (A1) through (A14), the first transistor may have a larger safe operating area (SOA) than the second transistor.

(A16) In any of the voltage regulators denoted as (A1) through (A15), a thickness of a gate of the first transistor may be larger than a thickness of a gate of the second transistor.

(A17) Any of the voltage regulators denoted as (A1) through (A16) may further include an inductor coupled between the intermediate terminal and an output terminal of the voltage regulator.

(A18) In any of the voltage regulators denoted as (A1) through (A17): (1) the controller may be configured to turn on the first transistor before turning on the second transistor; and (2) the controller may be configured to turn off the first transistor after turning off the second transistor.

(A19) In any of the voltage regulators denoted as (A1) through (A18): (1) the high-side device may be an n-type device, and (2) the low-side device may be an n-type device.

(B1) A method of operating a switch in a voltage regulator, the switch having a first terminal and a second terminal, and the voltage regulator including an inductor coupled to one of the first and second terminals, may include the following steps: (1) turning on a helper transistor coupled between the first and second terminals; (2) turning on a main transistor while the helper transistor is on, the main transistor coupled between the first and second terminals, the main transistor including a drain junction doping profile that results in a lower breakdown voltage than a breakdown voltage of the helper transistor; (3) turning off the main transistor while the helper transistor is on; and (4) turning off the helper transistor after the main transistor is turned off.

(B2) In the method denoted as (B1): (1) the helper transistor may have a first drain coupled to the first terminal and a first source coupled to the second-terminal; and (2) the main transistor may have a second drain coupled to the first terminal and a second source coupled to the second terminal.

(B3) Either of the methods denoted as (B1) or (B2) may further include: (1) delaying turning on the main transistor for a predetermined period of time after turning on the helper transistor; and (2) delaying turning off the helper transistor for a predetermined period of time after turning off the main transistor.

(B4) In any of the methods denoted as (B1) through (B3), the helper transistor may have an area less than the area of the main transistor.

(C1) A method of operating a voltage regulator in a test mode may include the following steps: (1) enabling a test mode for the voltage regulator having a high-side device and a low-side device, wherein the test mode allows for passing current through portions of the high-side device and the low-side device simultaneously; (2) turning on a transistor of the high-side device, wherein the transistor is coupled between an intermediate terminal of the voltage regulator and an input terminal of the voltage regulator; and (3) turning on a helper transistor and a main transistor of the low-side device coupled to the intermediate terminal, such that current through the transistor of the high-side device passes through the helper transistor and the main transistor of the low-side device.

(C2) The method denoted as (C1) may further include checking for a failure condition within the voltage regulator while the test mode is enabled.

(C3) The method denoted as (C2) may further include marking the voltage regulator as defective on detecting the failure condition.

(C4) In any of the methods denoted as (C1) through (C3): (1) the transistor of the high-side device may have a first source coupled to the intermediate terminal and a first drain coupled to the input terminal; (2) the helper transistor may include a second source coupled to a ground terminal of the voltage regulator and a second drain coupled to the intermediate terminal; and (3) the main transistor may include a third drain coupled to the second drain and a third source coupled to the ground terminal.

Other embodiments are within the scope of the following claims.

What is claimed is:

1. A voltage regulator, comprising:
   a high-side device including first and second transistors each coupled between an input terminal and an intermediate terminal, the first transistor having a higher breakdown voltage than the second transistor, the second transistor having a smaller safe operating area (SOA) than the first transistor, and the second transistor being larger than the first transistor;
   a low-side device coupled between the intermediate terminal and a ground terminal; and
   a controller configured to drive the high-side and low-side devices to (a) alternately couple the intermediate terminal to the input terminal and the ground terminal and (b) cause the first transistor to control a voltage across the second transistor during switching transitions of the second transistor.

2. The voltage regulator of claim 1, wherein the controller is further configured to:
   turn on the first transistor before turning on the second transistor; and
   turn off the first transistor after turning off the second transistor.

3. The voltage regulator of claim 2, wherein the low-side device includes:
   third and fourth transistors each coupled between the intermediate terminal and the ground terminal, the third transistor having a higher breakdown voltage than the fourth transistor;
   wherein the controller is further configured to drive the low-side device to cause the third transistor to control a voltage across the fourth transistor during switching transitions of the fourth transistor.

4. The voltage regulator of claim 3, wherein:
   the first transistor has a first drain coupled to the input terminal and a first source coupled to the intermediate terminal;
   the second transistor has a second drain coupled to the first drain of the first transistor and a second source coupled to the intermediate terminal, the voltage across the second transistor being a voltage between the second drain and the second source;

the third transistor has a third drain coupled to the intermediate terminal and a third source coupled to the ground terminal; and the fourth transistor has a fourth drain coupled to the third drain and a fourth source coupled to the ground terminal, the voltage across the fourth transistor being a voltage between the fourth drain and the fourth source.

5. The voltage regulator of claim 2, wherein:

the first transistor has a first drain coupled to the input terminal and a first source coupled to the intermediate terminal; and the second transistor has a second drain coupled to the first drain of the first transistor and a second source coupled to the intermediate terminal, the voltage across the second transistor being a voltage between the second drain and the second source.

6. The voltage regulator of claim 2, wherein a drain junction of the first transistor has a lighter doping profile than a drain junction of the second transistor.

7. The voltage regulator of claim 2, wherein a channel width of the first transistor is smaller than a channel width of the second transistor.

8. The voltage regulator of claim 2, wherein an on-state conductance of the first transistor is lower than an on-state conductance of the second transistor.

9. The voltage regulator of claim 2, wherein a switching time associated with the first transistor is longer than a switching time associated with the second transistor.

10. The voltage regulator of claim 2, wherein a thickness of a gate oxide of the first transistor is larger than a thickness of a gate oxide of the second transistor.

11. The voltage regulator of claim 1, further comprising an inductor coupled between the intermediate terminal and an output terminal of the voltage regulator.

12. The voltage regulator of claim 1, the high-side device further including an additional transistor coupled between the input terminal and the intermediate terminal.

13. The voltage regulator of claim 12, wherein the controller is further configured to drive the high-side device to cause the additional transistor to control a voltage across the first transistor during switching transitions of the first transistor.

14. A method of operating a voltage regulator, comprising:

driving high-side and low-side devices of the voltage regulator to alternately couple an intermediate terminal of the voltage regulator to an input terminal and a ground terminal; and driving first and second transistors of the high-side device to cause the first transistor to control a voltage across the second transistor during switching transitions of the second transistor, the first transistor having a higher breakdown voltage than the second transistor, the second transistor having a smaller safe operating area (SOA) than the first transistor, and the second transistor being larger than the first transistor.

15. The method of claim 14, further comprising:

delaying turning on the second transistor for a predetermined period of time after turning on the first transistor; and delaying turning off the first transistor for a predetermined period of time after turning off the second transistor.

16. The method of claim 15, further comprising driving the first and second transistors such that a switching time associated with the first transistor is longer than a switching time associated with the second transistor.

17. The method of claim 15, further comprising supplying energy from an input voltage source to a load via the high-side device and an inductor coupled to the intermediate terminal.

18. The method of claim 17, further comprising generating an intermediate voltage at the intermediate terminal by driving the high-side and low-side devices, the intermediate voltage having a rectangular waveform.

19. The method of claim 14, further comprising driving third and fourth transistors of the low-side device to cause the third transistor to control a voltage across the fourth transistor during switching transitions of the fourth transistor.

20. The method of claim 14, further comprising driving an additional transistor of the high-side device to cause the additional transistor to control a voltage across the first transistor during switching transitions of the first transistor.

* * * * *